United States Patent
Fitterling et al.

(10) Patent No.: US 9,377,077 B2
(45) Date of Patent: Jun. 28, 2016

(54) SPRING ELEMENT

(71) Applicants: Gerhard Fitterling, Missen-Wilhams (DE); Hans Christian Intelmann, Weissach (DE)

(72) Inventors: Gerhard Fitterling, Missen-Wilhams (DE); Hans Christian Intelmann, Weissach (DE)

(73) Assignee: Hahn Gasfedem GmbH, Waldstraβe, Aichwald (DE)

( * ) Notice: Subject to any disclaimer, the term of this patent is extended or adjusted under 35 U.S.C. 154(b) by 0 days.

(21) Appl. No.: 14/548,565

(22) Filed: Nov. 20, 2014

(65) Prior Publication Data

US 2015/0137436 A1    May 21, 2015

(30) Foreign Application Priority Data

Nov. 20, 2013   (DE) .......................... 10 2013 112 818

(51) Int. Cl.
| | | |
|---|---|---|
| F16F 9/56 | (2006.01) | |
| F16F 13/00 | (2006.01) | |
| F16F 9/516 | (2006.01) | |
| F16F 9/06 | (2006.01) | |

(52) U.S. Cl.
CPC .............. F16F 13/007 (2013.01); F16F 9/061 (2013.01); F16F 9/516 (2013.01)

(58) Field of Classification Search
CPC ............. F16F 9/002; F16F 9/007; F16F 9/06; F16F 9/535; F16F 9/3214; B60G 13/06; B60G 17/08; B60G 2202/24; B60G 2500/10; B60G 2500/30

See application file for complete search history.

(56) References Cited

U.S. PATENT DOCUMENTS

| | | | | |
|---|---|---|---|---|
| 2,155,978 A * | 4/1939 | Von Oberstadt | .......... | F16F 9/36 137/493.8 |
| 3,264,899 A * | 8/1966 | Swan | ........................ | F16B 1/00 137/512.5 |
| 3,656,593 A * | 4/1972 | Bauer | ...................... | A47B 9/10 188/300 |
| 5,458,219 A * | 10/1995 | Anderson | ................. | F16F 9/43 188/315 |
| 2004/0124571 A1* | 7/2004 | Gold | ..................... | F16F 9/3405 267/124 |
| 2006/0163017 A1* | 7/2006 | Verriet | .................... | F16F 9/063 188/315 |
| 2006/0283675 A1* | 12/2006 | Teraoka | ................ | F16F 9/5126 188/298 |
| 2008/0041681 A1* | 2/2008 | Shipman | ................... | F16F 9/56 188/319.2 |
| 2009/0107780 A1* | 4/2009 | Yazaki | .................... | F16F 9/092 188/269 |

* cited by examiner

*Primary Examiner* — Christopher Schwartz
(74) *Attorney, Agent, or Firm* — Bryan Peckjian; SKF USA Inc. Patent Dept.

(57) ABSTRACT

A braked spring element includes a first spring mechanism for absorbing and releasing energy, a second spring mechanism for absorbing and releasing energy and a damper assembly held between the first spring mechanism and the second spring mechanism, the damper assembly including a damper piston displaceably disposed in a fluid space and a piston rod connected to the damper piston.

18 Claims, 2 Drawing Sheets

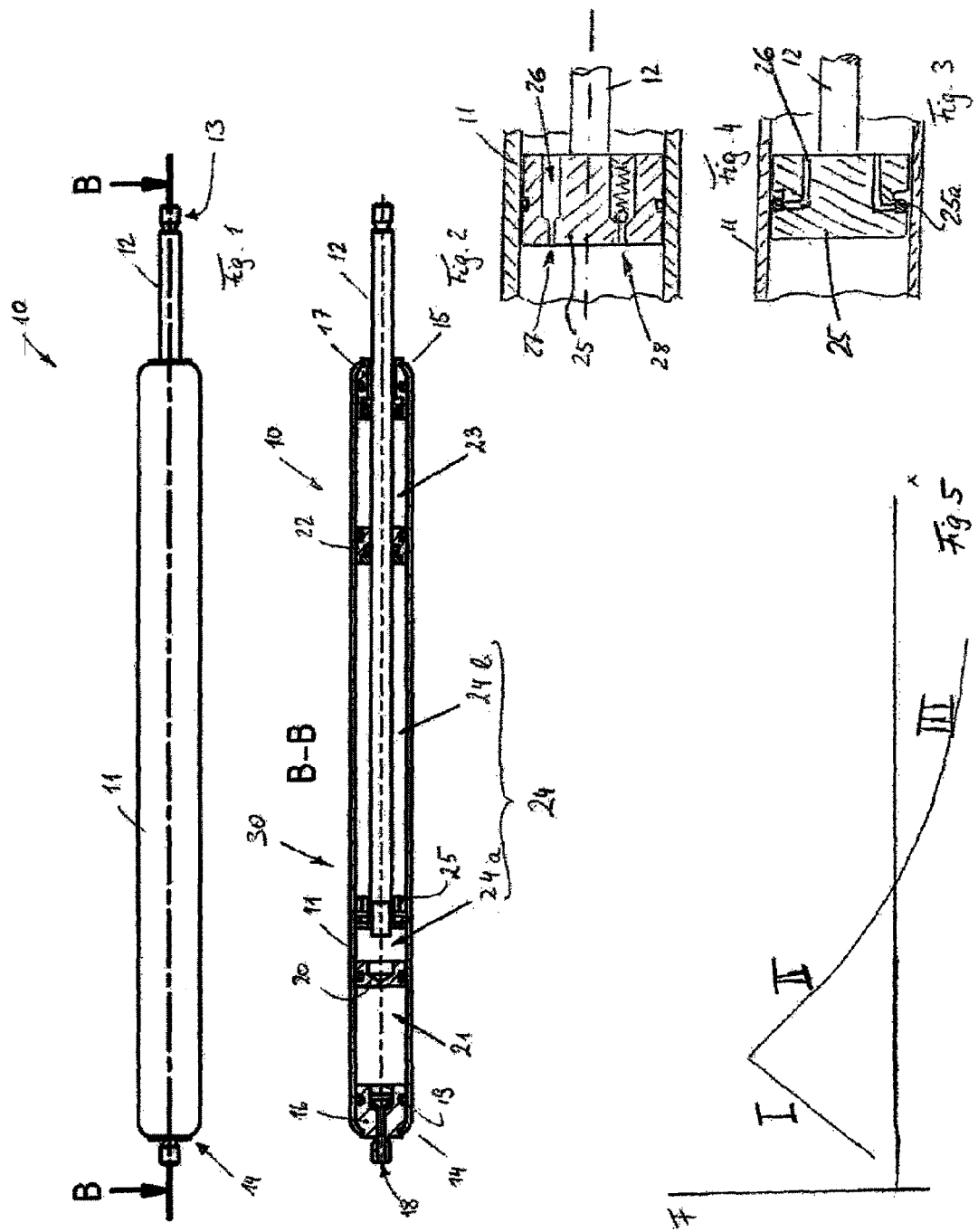

SPRING ELEMENT

CROSS-REFERENCE

This application claims priority to German patent application no. 10 2013 112 818.1 filed on Nov. 20, 2013, the contents of which are fully incorporated herein by reference.

TECHNOLOGICAL FIELD

The disclosure is directed to a spring element including an internal braking device, and, more specifically, to a gas spring.

BACKGROUND

Gas springs are used as spring elements in various fields, including in vehicles and in furniture. They provide a force that varies, within narrow limits, with the movement of the structures to which they are attached as those structures moves along a defined path. For example, gas springs may be used to support the weight of a flap or a valve or an other object, or to close doors, or to carry out similar functions.

When gas springs are used as spring elements on a sliding door, for encouraging the door to close, for example, the sliding door must be coupled to the gas spring before the door reaches the end of its closing path. To the extent possible this coupling should occur without impact and without producing a jolt/tug/jerk. In addition, the sliding door should first be gently slowed down and thereafter be slowly moved independently into its final position. For this reason, shock absorption systems are needed when a gas spring is used to guide a component like a sliding door into a final position.

SUMMARY

Embodiments of the present disclosure are directed to gas springs that address the foregoing problems.

A braked spring element according to the disclosure includes two springs or spring means which are disposed at mutually opposing ends of a damper assembly. As used herein, a "spring" or "spring means" may comprise a physical spring, such as a coil spring, or a quantity of gas that is compressed by a piston in a cylinder and that absorbs and releases energy in a manner generally similar to a spring. The spring means can be formed by for example by mechanical springs, resilient gas cushions, or similar devices. Furthermore, the spring means can be housed individually or integrated together with a damping assembly in a cylinder tube, or be disposed completely or partially outside the cylinder tube. The damping assembly held between the two spring means can be coupled to a moving element, e.g. a sliding door, in a low-noise and relatively-jerk-free manner.

At least one, and optionally two, spring means can be provided to pressurize the fluid in the damper assembly in order to preload or pretension a damper piston and associated piston rod in a desired initial position. However, the damper assembly can also be formed such that it does not include any pressurized components. Furthermore, it is possible to provide a separate (third) spring means for pressurizing the damping assembly.

Two gas spaces that act as springs, and/or mechanical compression springs, can be provided, one at either end of the damping assembly for axially resilient suspension of the damper assembly. The gas spring may include a cylinder tube, and the piston rod can extend through an end of the cylinder tube and optionally through a separating piston in the cylinder tube into an oil space where it connects to a damper piston. A liquid, preferably oil, is disposed in the oil space, and this liquid inhibits the movement of the damper piston in the oil space and thus the movement of the piston rod. The overpressure in the gas spaces and/or the mechanical springs can put the oil space under pressure by way of at least one separating piston. The spring element therefore has the force on its separating piston resulting from the product of the cross-section of the separating piston and the spring force. The oil space and the separating piston act as energy storage; the oil space and the damper piston act as a damping device; the gas spaces or the mechanical springs act as resilient-compliant/resiliently yielding centering and as a power source for the spring element.

The inventive spring element is explained below in the example of a gas spring. However, the description also applies to an inventive spring element which includes mechanical springs instead of the gas cushions.

The maximum achievable speed of the piston rod relative to the separating piston is limited by the configuration of the damper piston. Faster movements effect a compression of one of the gas spaces and are thus resiliently resisted. In this way moving objects which are to be transferred smoothly to a final position, can be coupled to the braked gas spring in a substantially shock-free manner without the use of an additional damper.

A resilient stop results from the arrangement of gas cushions on both sides of the oil space. Avoiding hard stops at the ends of the movement path of the piston rod can also lead to significant design simplifications in systems in which the braked gas spring is used.

The volume enclosed between both separating pistons is preferably filled with oil without bubbles. In all installation positions this results in uniform, jolt-free movement of the piston rod.

The gas spaces between the ends of the cylinder tube and the separating pistons are preferably filled with an inert gas, such as, for example, nitrogen. This inert gas is under excess pressure relative to the ambient atmosphere surrounding the gas spring, and the force of the gas spring and the range of travel of the springs at the two ends of the gas spring can be set as desired by the amount of the pressure and the amount of gas in the two gas spaces. For this purpose a fill valve is provided at least at the end of the cylinder tube farthest away from the piston rod. If desired, it is also possible to attach a further fill valve at the piston-rod-side end of the cylinder tube.

The damper piston defines at least one transfer path for the oil, so that the oil can move from one side of the damper piston to the other side of the damper piston. The transfer path can pass through the damper piston or pass around the damper piston. It is preferred to introduce one or more restrictions/restrictor bores/throttle bores in the damper piston, which extend through the damper piston and restrict the flow of oil.

A valve or valve means can be disposed in the transfer path to provide different flow resistances for fluid flowing in opposite directions along the transfer path. The valve means can, for example, be an axially movable seal ring which opens or closes a channel depending on the position of the seal ring relative to the piston.

The transfer path can also be formed by a channel having a restriction or restrictor bore. The channel can have symmetric flow properties, i.e. generate the same flow resistance with both forward and rearward flow. As indicated above, however, one or more channels can also be provided with a valve in order to achieve different flow resistance and thus different damping properties in different directions.

BRIEF DESCRIPTION OF THE DRAWINGS

These and other features and advantages of the present disclosure will be better understood after a reading of the following description together with the attached drawings.

FIG. 1 is a side elevational view of a braked gas spring according to an embodiment of the present disclosure.

FIG. 2 is a sectional elevation view of the gas spring of FIG. 1, taken in the direction of line B-B in FIG. 1.

FIG. 3 is a schematic sectional view of a damper piston for use in the gas spring of FIG. 1.

FIG. 4 is a schematic sectional view showing two alternate damper piston configurations useable in the gas spring of FIG. 1.

FIG. 5 is a force-path diagram of the braked gas spring according to FIGS. 1 and 2.

DETAILED DESCRIPTION

Figure 6:
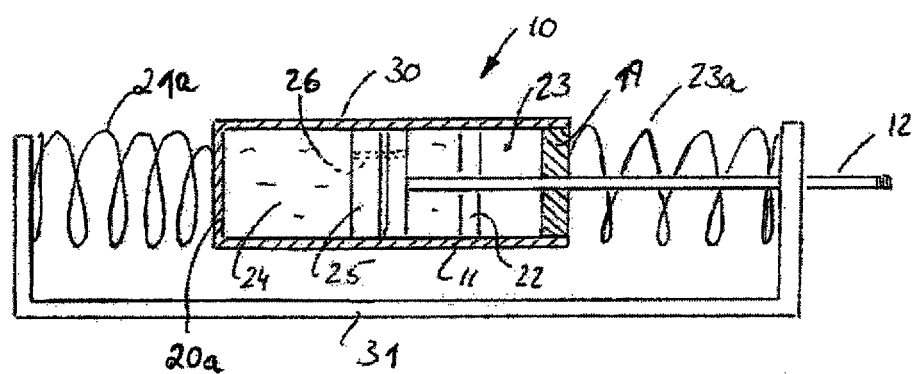
FIGS. 6 and 7 show modified embodiments of the disclosed spring element.

FIG. 1 illustrates a braked gas spring 10 as an example of an inventive spring element 1. The braked gas spring 10 includes a cylinder tube 11 and a preferably cylindrical piston rod 12 that protrudes axially from the cylinder tube 11. Structures for attaching further components to the gas spring 10, such as, for example, threads or the like, can be provided on the outer end 13 of the piston rod 12. An attachment structure, such as, for example, a threaded fitting, an eyelet, a lug, a grommet or the like, can be attached on the opposite end of the gas spring 10, which is also the end 14 of the cylinder tube 11.

Referring now to FIG. 2, the cylinder tube 11 is sealed at its first end 14 and at its opposite end 15 by first and second caps or cap pieces 16, 17. The second cap piece 17 includes a through-opening, and the piston rod 12 extends through this opening in a sealed and axially displaceable manner. The first cap piece 16 may include a fill bore 18 through which a gas can be introduced into the end of the cylinder tube 11 and a valve 19 for closing off the bore 18.

A first separating piston 20 is disposed in the interior of the cylinder tube 11 in the vicinity of the first cap piece 16 in a sealed and axially displaceable manner. The first separating piston 20 and the first cap piece 16, together with a section of the cylinder tube 11, define a first gas space 21.

A second separating piston 22 is provided between the first separating piston 20 and the second cap piece 17 in the interior of the cylinder tube 11 at a distance from the second cap piece 17, and the second separating piston 22 and the second cap piece 17 define, together with a part of the cylinder tube 11, a second gas space 23. The first and second gas spaces 21, 23 are filled with a pressurized gas, nitrogen, for example. The pressure of this gas can selected based on the use to which the gas spring is to be put, and may fall into the range of 10 to 70 bar or more, for example, 10 bar, 20 bar, 50 bar, 70 bar or more.

The piston rod 12 extends through the second cap piece 17 and, in a sealed manner, through the separating piston 22 and into an oil space 24. The oil space 24 is defined between the first and second separating pistons 20, 24. A damper piston 25 is located in the oil space 24, and the damper piston 25 is attached to the inner end of the piston rod 12, that is, the end of the piston rod 12 that is located in the interior of the cylinder tube 11. The damper piston 25 is axially displaceable in the cylinder tube 11, and the damper piston 25 permits oil to be transferred from a first partial space 24a (on the left side of the damper piston 25 in FIG. 2) into a second partial space 24b (on the right side of the damper piston 25 in FIG. 2) and vice versa. The first partial space 24a is defined by the damper piston 25 and the first separating piston 20, and the second partial space 24b is defined by the damper piston 25 and the second separating piston 22. The section of the cylinder tube 11 between the first and second separating pistons 20, 22, the damper piston 25, and the oil present in the oil space 24 form a damper assembly 30 between the first and second separating pistons 20, 22.

The damper piston 25 is illustrated in greater detail in FIG. 3, and may be sealed around its outer circumference against the cylinder tube 11 using a seal 25a, an O-ring, for example. The seal 25a sits in an annular groove in the damper piston 25, and the groove may be substantially wider than the seal 25a in the axial direction to allow for a certain axial mobility of the seal 25a against the damper piston 25. The seal 25a can thus serve as a valve or valve means which opens or closes one or more transfer channels 26 in a direction-dependent manner. That is, the seal 25a may shift to the right side of the groove in FIG. 3 when the damper piston 25 moves to the left in FIG. 3 and uncover the transfer channel 26, and the seal 25a may shift to the left side of the groove in FIG. 3 when the damper piston 25 moves to the right in FIG. 3 and block the transfer channel 26. The transfer channel 26 may extend directly from one side of the damper piston 25 to the other side of the damper piston 25 in an axial direction as illustrated in FIG. 4, or, alternately, the transfer channel 26 may extend from one axial side of the damper piston 25 to a circumferential surface of the damper piston 25 as illustrated in FIG. 3.

The transfer channel 26 may also be formed without a valve or valve means. For example, the transfer channel 26 may include a restriction 27 to limit oil flow and thereby achieve a damping effect. One or more than one transfer channel may be provided in any of these embodiments.

One or more of the transfer channels 26 may also be provided with a valve, for example a check valve 28, illustrated in the lower part of FIG. 4. (FIG. 4 includes two different transfer channel configurations 26 for illustration purposes, but embodiments may include only transfer channels of a single type.) The transfer channels 26 produce different sliding resistances of the piston 25 in the forward and rearward direction.

It is also possible to omit the seal provided around the circumference of the damper piston 25 and define a gap-type transfer path between the piston-circumferential surface and the cylinder tube 11. The damper piston 25 can also be provided with one or more transfer grooves on its circumferential surface.

The operation of the gas spring 10 is now described. FIG. 5 illustrates a force-path diagram of the gas spring 10 according to FIGS. 1 and 2 in a situation wherein a sliding door (not illustrated) travels with momentum and thus with a known initial speed, and is then coupled to the piston rod 12 of the gas spring 10. That is, the sliding door begins its closing motion without being coupled to the gas spring 10 but becomes coupled to the gas spring 10 at some point prior to reaching its fully closed position.

The piston rod 12 is initially in its retracted position, and when the sliding door engages the gas spring 10, the movement of the door starts to pull the piston rod 12 out of the cylinder tube 11, to the right in FIG. 2. This causes the damper piston 25 to slide to the right in FIG. 2 which forces oil from the second partial space 24b through the transfer channel 26 into the first partial space 24a; however, the oil present between the damper piston 25 and the second separating piston 22 can only flow through the transfer channel 26 at a limited rate, and this limits the rate of movement of the piston rod 12. As the oil is flowing through the transfer channel 26, pressure builds in the second partial space 24b and drives the second separating piston 22 toward the second end cap 17 and increases the pressure of the gas in the second gas space 23. This increase in pressure in the second gas space 23 is shown by section I of the characteristic line/performance curve/force-path of FIG. 5.

In the above described process, as the gas in the second gas space 23 is compressed and the oil flows from the second partial space 24b to the first partial space 24a, the sliding door is gently braked. However, as more oil flows from the second partial space 24b into the first partial space 24a, the pressure in the second partial space 24b decreases and allows the second separating piston 22 gradually return to its initial position. This also allows the pressure in the second gas space 23 to decrease as illustrated by section II of the characteristic line in FIG. 5.

Once the second separating piston reaches its initial position, the gas spring 10 stops performing a decelerating function and begins to act as a drive for moving the sliding door a final distance into its closed position in a controlled manner. That is, the foregoing movements of the damper piston 25 and the second separating piston 22 also move the first separating piston 20 to the left in FIG. 2 and compress the gas in the first gas space 21. As the various pressures equalize, the relatively high pressure in the first gas space 21 moves the first separating piston 20 back to the right, which pushes the damper piston 25 and piston rod 12 to the right and helps close the sliding door.

Section III of the characteristic line in FIG. 5 shows that the first and second gas spaces 21, 23 put the oil volume in the oil space 24 under pressure using the first and second separating pistons 20, 22. The outward-(rightward)-directed force acting on the piston rod 12 is equal to the product of the gas pressure and the piston cross-section. However, in the section I of the characteristic line, the piston rod 12 can only move relatively slowly. The restriction 27 in the damper piston 25 acts to slow the rate at which the piston rod 12 is pulled from the cylinder tube 11 and permits the piston rod 12 to extend based on the speed at which the oil can flow from the second partial space 24b to the first partial space 24a. Once the damper piston 25 reaches the separating piston 22, or the door reaches an end stop, movement stops.

The gas spring described herein can be used as a closer spring, for example, on heavy sliding doors. The gas spring urges the sliding door into its end or closed position which occurs when the piston rod is extended. Conversely, opening the sliding door initially occurs against the force of the gas spring and compresses the gas spring by driving the damper piston 25 toward the first separating piston 22. Once the gas spring 10 is compressed in this manner, it is locked by an external mechanism (not illustrated), and the sliding door is disconnected from the gas spring so that it can be opened further. When closing the sliding door, it is initially moved by hand towards the end or closed position. As it approaches the end position, it is coupled again to the gas spring in order to brake the sliding door and then gently urge it into its end and closed position. The gas spring thus acts in a threefold manner, namely in a resilient-compliant manner when coupling the moving sliding door onto the piston rod, in a damping and braking manner during further movement of the door, and also in a driving manner to urge the sliding door into the end or closed position.

Further embodiments of the invention are described below. The existing reference numerals are used without further description for elements already described above which are identical in function or construction. The preceding description applies accordingly.

In the embodiment of the spring element 1 illustrated in FIG. 6, the damper assembly 30 is held between two mechanical compression springs 21a, 23a. These can be supported in an external frame 31, which is only schematically indicated, so that the damper assembly 30 is axially resiliently movable in the longitudinal direction of its piston rod 12. The damper assembly 30 comprises a cylinder including the oil space 24 formed therein and the damper piston 25 displaceably supported there. The first separating piston 20 is absent or is replaced by a fixed cylinder end. In the cylinder 11 the oil space 24 can in turn be delimited at least on one side by the second separating piston 22. The second gas space 23 is in turn formed between the second separating piston 22 and the second cap piece 17, in which second gas space 23 gas is present under greater or lesser pressure in order to affect the filling of the oil space. The gas cushion thus formed can also be supported or replaced by a mechanical compression spring.

The function of the spring element illustrated in FIG. 6 largely corresponds to the function of the above-described spring element according to FIGS. 1 and 2, with the difference that in this embodiment the force for extending the piston rod 12 from the gas cushion into the gas space 23 (and/or the alternative mechanical compression spring) is defined independently of the force of the compression springs 21a, 23a.

Figure 7:
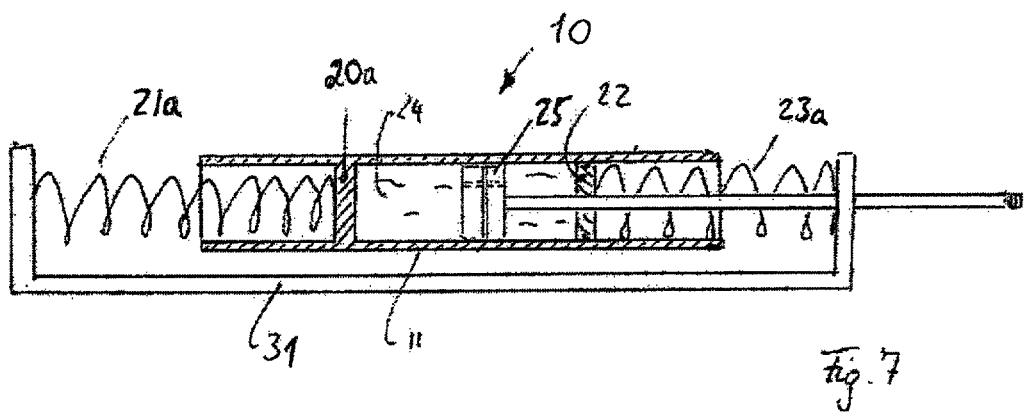

A further modified embodiment of the spring element 1 is illustrated in FIG. 7. In this embodiment the cap piece 17 and the first and second gas spaces 21, 23 are absent from the cylinder tube 11. Instead, a compression spring 23a is supported directly on the separating piston 22. As in the spring element 1 according to FIG. 6, the first separating piston 20 is replaced by a fixed cylinder end 20a.

The function of the spring element illustrated in FIG. 7 substantially corresponds to the function of the spring element 1 described earlier in the context of FIGS. 1 and 2, with the difference that the action of the gas cushion in the gas spaces 21, 23 is performed by the compression springs 21a, 23a.

It is to be noted that in a further alternative embodiment the separating piston 22 is replaced by a stationary wall in the cylinder tube 11, and the cylinder end 20a is formed by the axially movable separating piston 20. Such an arrangement also produces the above-described function.

According to the disclosure, a braked spring element 10 is provided which includes on the end of its cylinder tube 11 two springs or spring means, preferably resilient gas cushions 21, 23. These are separated by first and second separating pistons 20, 22 from an oil space 24 which is under the same pressure. A damper piston 25 is disposed in the oil space 24 and is connected to the piston rod 12. The gas cushions 21, 23 are identically resilient and act as pressure accumulators for generating the force on the piston rod 12. The oil enclosed in the oil space 24 transmits the pressure of the first and second gas spaces 21, 23 or, alternatively, mechanical springs, to the piston rod 12, and is also a damper volume for the damping of the movement of the damper piston 25 and thus of the piston rod 12.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved gas springs.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Spring element
10 Gas spring
11 Cylinder tube
12 Piston rod
13 End of the piston rod 12
14, 15 Ends of the cylinder tube 11
16, 17 First and Second cap pieces
18 Fill bore
19 Valve
20 First separating piston
20a Cylinder end
21 First gas space
21a First compression spring
22 Second separating piston
23 Second gas space
23a Second compression spring
24 Oil space, partial spaces 24a, 24b
25 Damper piston
25a Seal or valve member
26 Transfer channel
27 Restriction
28 Check valve
I-III Sections of the force-path characteristic line
30 Damper assembly
31 Frame

What is claimed is:

1. A braked spring element comprising:
a cylinder tube having first and second ends;
a first space for absorbing and releasing energy delimited between a first separating piston and the first end of the cylinder tube;
a second space for absorbing and releasing energy delimited between a second separating piston and the second end of the cylinder tube; and
a damper assembly held between the the first separating piston and the second separating piston, the damper assembly including a damper piston displaceably disposed in a fluid space and a piston rod connected to the damper piston,
wherein the first and second spaces are never in fluid communication with each other, and wherein a length of the cylinder tube remains constant such that the cylinder tube does not axially extend or compress.

2. The braked spring element according to claim 1, wherein the cylinder tube is closed on the first and second ends, and wherein the piston rod extends through and forms a sliding seal with one of the ends of the cylinder tube.

3. The braked spring element according to claim 2, wherein the first separating piston forms an axially slidable seal in the cylinder tube.

4. The braked spring element according to claim 3, wherein the second separating piston forms an axially slidable seal in the cylinder tube, the second separating piston including a though opening, the piston rod extending through the through opening and forming a sliding seal with the second separating piston.

5. The braked spring element according to claim 4, wherein the damper piston is disposed in the cylinder for sliding axial movement relative to the cylinder and the first and second separating pistons.

6. The braked spring element according to claim 5, wherein the first space comprises a gas-filled volume enclosed between the first end and the first separating piston.

7. The braked spring element according to claim 6, wherein the damper piston includes at least one transfer path, the at least one transfer path providing a fluid connection between a first side of the damper piston and a second side of the damper piston.

8. The braked spring element according to claim 7, wherein the transfer path comprises a restrictor bore.

9. The braked spring element according to claim 7, wherein the transfer path has a first flow resistance to fluid flow in a first direction along the transfer path and a second flow resistance, different than the first flow resistance, to fluid flow in a second direction along the fluid path opposite to the first direction.

10. The braked spring element according to claim 7, wherein the transfer path comprises at least one channel and a valve disposed in the at least one channel.

11. The braked spring element according to claim 5, wherein the first space comprises a mechanical compression spring.

12. The braked spring element according to claim 1, wherein the damper piston includes at least one transfer path, the at least one transfer path providing a fluid connection between a first side of the damper piston and a second side of the damper piston and wherein the transfer path has a first flow resistance to fluid flow in a first direction along the transfer path and a second flow resistance, different than the first flow resistance, to fluid flow in a second direction along the fluid path opposite to the first direction.

13. The braked spring element according to claim 1, wherein the first end of the cylinder tube is closed and the second end has an opening an opening, the damper assembly being mounted in the cylinder tube and the piston rod extending through the opening and forming a sliding seal with the opening, wherein the piston rod extends through the second separating piston and forming a sliding seal with the second separating piston.

14. A braked spring element comprising:
a cylinder tube having a first closed end and a second end having an opening;
a damper assembly mounted in the cylinder tube, the damper assembly including a damper piston and a piston rod extending from the damper piston through the opening and forming a first sliding seal with the opening;

a first separating piston between the first end and the damper piston and a first gas space in the cylinder tube between the first separating piston and the first end;

a second separating piston between the damper piston and the second end, the piston rod extending through the second separating piston and forming a sliding seal with the second separating piston, and a second gas space between the second separating piston and the second end, wherein the first and second gas spaces are never in fluid communication with each other, and wherein a length of the cylinder tube remains constant such that the cylinder tube does not axially extend or compress.

15. The braked spring element according to claim 14, including a first gas filling the first gas space and a second gas filling the second gas space, and a liquid surrounding the damper assembly between the first separating piston and the second separating piston.

16. The braked spring element according to claim 15 including a transfer channel in the damper piston configured to place a first liquid space on a first axial end of the damper piston in fluid communication with a second liquid space on a second axial end of the damper piston.

17. The braked spring element according to claim 16 including a valve for regulating flow through the transfer channel.

18. The braked spring element according to claim 16 wherein the transfer path has a first flow resistance to fluid flow in a first direction along the transfer path and a second flow resistance, different than the first flow resistance, to fluid flow in a second direction along the fluid path opposite to the first direction.

* * * * *